Patented Dec. 16, 1924.

1,519,973

UNITED STATES PATENT OFFICE.

ASOBU NAITO, OF TOKYO, JAPAN, ASSIGNOR TO GORO MATSUKATA, OF TOKYO, JAPAN.

PROCESS OF TREATING MAGNETIC SAND OR PULVERIZED IRON ORE.

No Drawing.   Application filed September 8, 1921.   Serial No. 499,301.

*To all whom it may concern:*

Be it known that I, ASOBU NAITO, a subject of the Emperor of Japan, and a resident of No. 2174 Arai-juku, Ebara-Gun, Tokyo, Empire of Japan, have invented new and useful Improvements in Processes of Treating Magnetic Sand or Pulverized Iron Ore, of which the following is a specification.

This invention is an improved process of treating magnetic sand or powdered iron ores and is particularly described as follows.

The magnetic sand or fine ore to be treated by my improved process is first mixed with a suitable quantity of powdered coal which is then heated in a closed vessel to approximately 1000 degrees C. so as to obtain a coke containing more or less ore, the preferred proportions being two parts of fine ore and one part of coal, by weight.

The coke thus obtained is then taken out on open ground and piled to a suitable height, and I then proceed to pass through said pile from underneath, a quantity of sulphur dioxide gas or chlorine gas, or I pour over the said pile a solution of caustic alkali or sea water, so that the iron contained in the coke is rendered soluble to such an extent that the pores of the coke are filled with iron salt. The coke thus treated is then exposed to the air so as to change the iron to hydrate which will produce an agglomerate of fine ore and coke suitable for use in a blast furnace.

What I claim is:—

1. A process of treating magnetic sand or pulverized iron ore which consists in mixing said ore with a powdered coal, heating the compound so as to produce a coke-containing iron ore, heaping up the product on open ground and exposed to the air and causing the iron contained in the said coke to be rendered soluble and to be impregnated therewith, further oxidizing the same by exposure to the air, to form the same into an agglomerate suitable for use in a blast furnace.

2. A process of treating magnetic sand or pulverized iron ores which consists in mixing said ore with a powdered coal, heating the compound to produce a coke-containing iron ore, heaping up the product on open ground and exposed to the air and causing the iron contained in the said coke to be rendered soluble and to be impregnated therewith and further oxidizing the same by exposure to the air.

In testimony whereof I affix my signature in presence of two witnesses.

ASOBU NAITO.

Witnesses:
M. OTSUKA,
EDWARD C. WYNNE.